ABSTRACT OF THE DISCLOSURE

Catalytic composition containing elemental nickel, nickel oxide or mixtures thereof and a zirconia carrier in which the content of nickel, expressed as elemental nickel and based on the total weight of the catalyst is from about 0.01 to about 0.7 weight percent, and method for the steam reforming of hydrocarbons in the presence of said catalyst to produce gaseous product containing hydrogen without substantial, permanent deposition of carbon on the catalyst.

---

This invention relates to the production of hydrogen by the conversion of hydrocarbons with steam in the presence of a particular contact material.

Steam reforming of hydrocarbons is a process by which a hydrocarbon and steam are contacted with a catalyst to produce gaseous product comprising hydrogen and carbon oxides, and is well known to the art of hydrogen production. Hydrogen-rich gases including those containing carbon monoxide produced by steam reforming of hydrocarbons are useful in the Fischer-Tropsch process for the synthesis of hydrocarbons boiling in the gasoline range or oxygenated organic compounds such as alcohols and ketones. These gases also are useful in hydrogenation processes, in ammonia, methanol or isobutanol synthesis as well as for the reduction of metallic oxides and as fuel for domestic and industrial uses.

One type of contact material frequently employed in steam reforming reactions is a two component catalyst composed of a nickel component present in relatively high amounts such as from about 4 to about 40 percent by weight of the total composite, supported on or diluted with an oxidic refractory support comprising alumina. It is observed however that during use in the steam reforming reaction, the activity of the catalyst declines.

Another drawback of such two component prior art steam reforming catalysts is that they are unsatisfactory for the conversion of certain hydrocarbon feedstocks such as normally liquid feeds and feeds containing substantial amounts of olefinic compounds in that they cause rapid laydown of carbon or soot on the catalyst. Carbon deposition on the catalyst is a troublesome problem and, in addition to mechanical problems such as plugging of equipment, carbon deposition also requires frequent reconditioning of the catalyst by oxidative carbon burn-off treatment which contributes to the gradual decline in catalyst activity.

It is an object of this invention, therefore, to provide an improved nickel catalyst for the steam reforming of hydrocarbons which catalyst retains its catalytic activity over prolonged periods of use and exposure to steam at elevated temperatures.

Another object of this invention is to provide an improved contact material which is useful for the steam reforming of hydrocarbons, particularly normally liquid hydrocarbons and feeds containing substantial amounts of olefinic hydrocarbons, without deleterious carbon deposition on the catalyst.

A further object of this invention is to provide a catalyst having the above characteristics and which also allows for the conversion of the hydrocarbon and steam at relatively low steam-to-carbon ratios.

Various other objects and advantages of this invention will become apparent to those skilled in the art from the accompanying description and disclosure.

Accordingly, the above objects are accomplished by the process which comprises contacting a hydrocarbon with steam at an elevated temperature in the presence of a contact material composed of a nickel component in an amount between about 0.01 and about 0.7 weight percent expressed as elemental nickel and based on the total weight of the catalyst, and an inorganic refractory support which is formed of at least 90 percent by weight of an oxide of zirconium, expressed as zirconium dioxide. The term "nickel component" as used herein is intended to include nickel in elemental as well as in combined form. This component is usually present in the form of a member of the group consisting of elemental nickel, nickel oxide and mixtures thereof.

It has been found that the particular combination of the low content of nickel component distributed on the oxidic zirconium support possesses marked advantages for the steam reforming of hydrocarbons. One advantage is that notwithstanding their low content of active nickel component, the contact materials of this invention maintain their activity and ability to convert the hydrocarbon feed and steam to hydrogen-rich gas for prolonged periods of use and exposure to steam at elevated temperatures. Another advantage is that they catalyze the steam reforming of normally liquid hydrocarbons and olefin-containing feeds without permanent deposition of deactivating amounts of carbon on the catalyst, such feeds being only difficultly reformed using conventional two component catalysts. Another advantage is that the steam reforming of such feeds can be effected without troublesome carbon deposition at relatively low steam requirements. Thus by the use of the contact materials of this invention available and relatively inexpensive feed stocks are rendered commercially feasible feed stocks. In addition other feeds such as natural gas can be converted to hydrogen-rich gas at steam requirements which are significantly lower than those currently employed thereby improving the general economics of the process.

The nickel component of the catalyst of this invention is distributed on an inorganic refractory support containing from 90 to 100 percent by weight of an oxidic compound of zirconium, expressed as zirconium dioxide. The support may contain up to 10 percent by weight, on a combined basis, of certain other metal oxides including those capable of forming stable zirconium metallates or metal zirconates. For example, the support may contain titanium dioxide and silicon dioxide which are known to react with zirconium dioxide to form the metallates, zirconium titanate ($ZrTiO_4$) and zirconium silicate ($ZrSiO_4$), respectively. Usually each of such metals is present in an amount no greater than about 2 percent by weight, expressed as titanium dioxide or silicon dioxide, respectively, based on the total weight of the support. Other metal oxides which can be present are hafnia and calcium oxide the contents of which are usually no greater than about 3 and 6 percent by weight, respectively, based on the total weight of the support. Although the support may contain these additional metal oxides without deleteriously effecting the desired catalytic properties of the catalyst, it is preferred that the catalyst be free of oxides which combine either chemically or physically with the nickel component. Thus, for example, the support is free of uncombined alumina which is known to react with nickel oxide to form the spinel, nickel aluminate ($NiAl_2O_4$), and is also free of magnesia which forms a solid solution with the nickel component. In either case, the steam-hydrocarbon reforming properties of the catalysts of this invention are adversely affected.

The support of the present invention may be derived from naturally occuring ores such as zirconium silicate ore in which case the support usually contains incidental impurities such as residual titanium dioxide, silicon dioxide and hafnia in the above-stated amounts and small amounts of iron oxide, i.e., not more than about 0.5 weight percent. Commercially available zirconia of refractory grade usually contains calcium oxide or magnesia added to stabilize the thermal expansion properties of the refractory. Although calcium oxide is suitable as such a thermal stabilizer in the supports of the contact materials of this invention, magnesia-stabilized supports are to be avoided for the reason already noted.

Substantially pure zirconium dioxide is prepared synthetically by precipitation of the hydrous oxide by treatment of zirconium salts such as zirconium nitrate, carbonate or sulphate with aqueous alkaline solutions such as ammonium hydroxide. The precipitated hydrous oxide is dried, washed and, if desired, calcined at an elevated temperature such as between about 800° F. and about 1400° F.

The term "zirconia" is used herein and in the appended claims to describe the supports of the catalysts of this invention and, as used, is intended to include, unless otherwise indicated, an inorganic refractory material consisting of between about 90 and about 100 percent by weight of an oxidic compound of zirconium expressed as zirconium dioxide, 0 to about 6 percent by weight of combined calcium, expressed as calcium oxide, 0 to about 2 percent by weight of combined titanium expressed as titanium dioxide, 0 to about 2 weight percent of combined silicon expressed as silicon dioxide, 0 to about 3 weight percent hafnia, and 0 to about 0.5 weight percent of iron oxide, the combined weight of these other oxides not exceeding 10 weight percent of the total weight of the support.

The improved steam reforming catalysts of this invention are prepared by treating the support either in the form of hydrous zirconia, dried or calcined zirconia, with an aqueous solution of a compound of nickel which is preferably thermally decomposable to nickel oxide, in an amount sufficient to provide between 0.01 and about 0.7 weight percent of the nickel component, expressed as elemental nickel, in the final catalyst. Usually, the catalyst contains at least 0.05 weight percent nickel and no more than 0.5 weight percent. Typical examples of suitable precursor compounds are nickel salts such as nickel nitrate, nickel carbonate and nickel sulfate. After the zirconia support is treated with the aqueous nickel salt solution, the mass is dried and the dried composite is calcined to convert the salt to nickel oxide, elemental nickel or mixtures thereof. Drying is usually accomplished at a temperature between about 200° F. and about 400° F. for between about one and about thirty hours although shorter or longer periods may be used as required. Calcination is performed at a temperature from about 600° F. to about 2000° F. and more usually at a temperature from about 800° F. to about 1400° F., in the presence of air or nitrogen to convert the salt to nickel oxide, or in the presence of a hydrogen-containing reducing gas to convert at least a portion of the salt to elemental nickel. Prior to use, the catalyst can be pre-conditioned with a hydrogen-containing gas at a temperature between about 800° F. and about 1500° F., although such treatment is not essential to satisfactory performance of the catalyst.

The zirconia supported nickel catalysts of this invention are useful for the steam reforming of a wide variety of hydrocarbon feeds including natural gas, olefinic feeds and normally liquid feeds. The feedstock may contain aliphatic and aromatic hydrocarbons from methane to high molecular weight compounds including acyclic and alicyclic paraffinic and olefinic compounds such as those containing up to about 40 carbon atoms per molecule and having molecular weights up to about 560. The hydrocarbon feed may be a single hydrocarbon such as those of the homologous series, $C_nH_{2n+2}$ and $C_nH_{2n}$, for example, ethane, propane, butane . . . dodecane, etc., and ethylene, propylene, butylene, etc., or mixtures thereof. The catalysts of this invention are particularly useful for the conversion with steam of feedstocks containing from about 5 to about 90, and usually not more than 80, mol percent of olefin including refinery and coke oven gases. Also included within the scope of this invention is the steam reforming of normally liquid feedstocks such as those containing 50 mol percent or more of $C_5$ and higher compounds. Typical examples of such feedstocks are the various petroleum fractions such as naphtha distillates including light naphtha (e.g., boiling range of 100°–250° F.), heavy naphtha (e.g., boiling range of 200°–400° F.), gas oil (boiling range of 400°–700° F.), and other liquid and viscous feeds such as mineral oils and crude petroleum oils including topped and residual oils.

The relative amount of the hydrocarbon and steam reactants is expressed as the steam-to-carbon ratio which is defined as the number of mols of steam charged to the steam reforming reaction zone per atom of carbon in the hydrocarbon feed charged. For example, a feed gas composition of 6 mols of steam per mol of propane corresponds to a steam-to-carbon ratio of 2.0. For any individual hydrocarbon from methane to higher molecular weight compounds and fractions, there is a minimum steam-to-carbon ratio required for the carbon-free catalytic reforming of that individual hydrocarbon or fraction. The term "minimum steam-to-carbon ratio" as used herein is that ratio below which sufficient carbon deposits on the catalyst to give an observable rise in the pressure drop across the catalyst bed. One factor which we have found to contribute to the carbon deposition problem during reforming of hydrocarbons and especially reforming of normally liquid and olefin-containing feeds, is the relatively high nickel content of known catalysts which usually contain between about 4 and about 40 weight percent of the nickel component. In overcoming this problem we have found, contrary to expectation, that the steam reforming catalysts of this invention which contain a low content of the nickel component are not only highly active for steam reforming in that they allow 100 percent conversions of the hydrocarbon feed per pass, but they also allow for the conversion of the hydrocarbon feed at substantially lower steam requirements than are required by conventional catalysts. Thus in using the catalysts of this invention, minimum steam-to-carbon ratios as low as from about 1.3 to about 5 can be used without deleterious carbon formation on the catalyst. The specific minimum steam-to-carbon ratio within this range is influenced by the particular feedstock and increases as the olefinic content and/or molecular weight of the feed increases. From the standpoint of operating without permanent deposition of deactivating amounts of carbon on the catalyst, there is no upper limit to the steam-to-carbon ratio and thus ratios as high as about 10 or higher can be used. For economic and practical reasons, however, the steam-to-carbon ratio is usually no higher than about 6.

The process of this invention is effected over a relatively wide range of operating conditions including a temperature between about 600° F. and about 1800° F. When hydrogen containing gas consisting essentially of hydrogen and carbon oxides is the desired product, the temperature is normally maintained between about 1000° F. and about 1800° F., and more usually between about 1200° F. and about 1600° F. Also included within the scope of this invention is the production of hydrogen-containing gas comprising up to about 60 mol percent of normally gaseous hydrocarbons such as methane, ethane, etc., and having a high calorific value such as between about 300 and about 1000 B.t.u. per standard cubic foot. The latter type of gaseous product which is commonly referred to as town's gas, is produced within the lower temperature range of between about 600° and about 1000° F.

In operation it is preferred to preheat the feed prior to introduction to the catalyst bed. For example, preheating of the hydrocarbon feedstock at a temperature between about 600° F. and about 1200° F. facilitates attainment and maintenance of suitable temperatures in the reforming zone. This is of some importance because, if the feedstock contacts the catalyst bed at low temperatures, an otherwise adequate steam-to-carbon ratio may not prevent carbon formation at or near entrance to the catalyst bed. Since catalytic steam reforming is endothermic there are practical limits to the amount of heat which can be added to maintain the suitable elevated temperatures in the reforming zone. It is preferred to preheat the feedstock to as high a temperature as is consistent with avoiding pyrolysis or other heat deterioration of the feed.

The process is operable at atmospheric pressure and pressures above atmospheric without significant effect on the steam-to-carbon ratio. When steam reforming with the zirconia supported nickel catalysts described herein, the choice of a particular operating pressure is principally influenced by the subsequent use of the gaseous hydrogen product. For many significant uses, the process is effected at superatmospheric pressure in order to minimize subsequent compression of the product. Generally the catalytic reforming zone is operated at a pressure between about 0 and about 1000 pounds per square inch gage (p.s.i.g.) and more usually at a pressure not greater than about 800 p.s.i.g. When operating at elevated pressures such as from about 200 to about 400 p.s.i.g., it is preferred to employ a steam-to-carbon ration of from about 2 to about 4 in order to maintain a high conversion of hydrocarbon feed.

The space velocity in the catalytic reforming zone ranges between about 50 and about 1000 volumes of hydrocarbon, expressed as $C_1$ equivalents per hour per volume of reforming catalyst and, more usually a space velocity of from about 100 to about 750 is employed.

The zirconia supported catalysts of this invention may be used in the form of lumps of irregular shapes, extrusions, rings, compressed pellets or powder including layers of these various physical forms. The operation may be as a fixed catalyst bed or a fluidized catalyst system. The steam required for the reforming may be premixed with the hydrocarbon feed or it may be admitted to the reaction zone by a separate line. The feed may also contain various inert materials such as nitrogen. Oxygen may be admitted to the reaction zone in an amount from about 0.2 to about 0.8 or more mols per mol of organic compound in the feed and may be admitted as an oxygen-rich gas or as air. When the hydrogen product is utilized for the synthesis of ammonia, air is suitably employed.

The following examples are offered as a better understanding of the present invention and are not to be construed as unnecessarily limiting thereto.

CATALYST A

The zirconia employed in the preparation of this catalyst has the following chemical composition: 94.78 weight percent zirconium dioxide, 4.29 weight percent calcium oxide, 0.57 weight percent silica, 0.27 weight percent titania and 0.09 weight percent iron oxide. Other characteristics of the zirconia include a porosity of 33–36 percent, an apparent specific gravity of 5.3–5.6 grams per cc. and a surface area of less than 1 square meter per gram. A 200 gram portion of this zirconia in the form of 12/20 mesh particles was impregnated with 48 cc. of water containing 0.99 gram of dissolved nickel nitrate hexahydrate. After thorough mixing, the impregnated mass was dried at 240° F. and calcined for two hours at 1000° F. Based upon ingredients added, the calcined catalyst contains 0.1 weight percent nickel, expressed as elemental nickel.

CATALYST B

The zirconia employed in the preparation of this catalyst has the following chemical composition: 92.70 weight percent zirconium dioxide, 3.5 weight percent calcium oxide, 1.57 weight percent silica, 0.25 weight percent titania, 0.16 weight percent iron oxide, 1.40 weight percent hafnia and 0.38 weight percent alumina. Other characteristics include an apparent porosity of 43.4–43.8 percent and an apparent specific gravity of 5.62–5.65 grams per cc. A 174 gram portion of this zirconia in the form of 12/20 mesh particles was impregnated with a solution containing 12.8 grams of nickel nitrate hexahydrate dissolved in 40 cc. of water. After mixing thoroughly the impregnated mass was dried at 240° F. and then calcined for two hours at 1000° F. Based upon the ingredients added, the calcined catalyst contains 1.3 weight percent nickel, expressed as elemental nickel.

CATALYST C

A 241.5 gram portion of the zirconia employed in the preparation of Catalyst A above and in the form of 12/20 mesh particles, was impregnated with a solution containing 49.5 grams of nickel nitrate hexahydrate dissolved in 41 cc. of distilled water. The impregnated mass was mixed thoroughly and dried in an oven at 230° F. with intermittent stirring. The dried mass was then calcined for 2 hours at 1000° F. Upon analysis, the calcined composite was found to contain 4.64 weight percent nickel oxide, which is equivalent to 3.64 weight percent, expressed as elemental nickel.

The above Catalysts A, B and C were tested for their efficacy as steam-hydrocarbon reforming catalysts in a reactor consisting of a one inch diameter quartz tube fitted with an internal thermowell. Approximately 100 cc. (12/20 mesh) of catalyst was used to make up a catalyst bed eight inches in length. The catalyst bed was located below alundum chips used as the preheat zone. Before the start of the runs, the charge of catalyst was hydrogen pretreated for one hour at 1400° F. Water was metered through a calibrated flow meter, vaporized and mixed with preheat hydrogen gas at the reactor inlet. When the steam flow was established, the hydrogen flow was stopped and the hydrocarbon feed cut in. During the reforming operation, the catalyst temperature was measured at the top, middle and bottom of the catalyst bed. Effluent gases were passed through a condenser and receiver to collect unreacted water. After measuring in a wet test meter, the product gas was vented and the effluent gases were sampled and analyzed by gas chromotography or mass spectrogram techniques. Pressure drop across the catalyst bed was measured to give an indication of whether or not carbon was forming and plugging the bed as would be shown by a measurable rise in the reactor pressure drop across the catalyst bed.

Using the above-described reactor and procedure a series of runs was made at atmospheric pressure with Catalysts A, B and C as freshly prepared using an ethylene-ethane feed containing a major proportion of ethylene. In the testing, carbon deposition on the catalyst is evidenced by a rise in the pressure drop across the catalyst bed, and the minimum steam-to-carbon ratio required to obtain carbon-free reforming is determined from the rate of increase in the pressure drop. The particular feed, operating conditions and results are tabulated in the following Table I.

TABLE I

| | Run Number | | | | |
|---|---|---|---|---|---|
| | 1 | 2 | 3 | 4 | 5 |
| | Catalyst Designation | | | | |
| | A | | B | C | |
| Support | Zirconia | | Zirconia | Zirconia | |
| Nickel, weight percent | 0.1 | | 1.3 | 3.6 | |
| Volume, cc | 100 | | 100 | 100 | |
| Weight, grams | 185.7 | | 167.4 | 173.8 | |
| Hydrocarbon feedstock | 30% ethane/70% ethylene | | | 32% ethane/68% ethylene | |
| Operating Conditions: | | | | | |
| Reactor temperature, °F., top | 1,185 | 1,190 | 1,235 | 1,200 | 1,173 |
| Reactor temperature, °F., middle | 1,294 | 1,288 | 1,390 | 1,383 | 1,382 |
| Reactor temperature, °F., bottom | 1,430 | 1,430 | 1,420 | 1,422 | 1,428 |
| Flow Rate: | | | | | |
| Hydrocarbon, cc./minute | 105 | 106 | 34 | 32 | 51 |
| Steam, cc./minute | 0.33 | 0.25 | 0.75 | 0.55 | 0.55 |
| Space velocity, cc. C₁/hr./cc. catalyst | 126 | 127 | 41 | 38 | 61 |
| Steam/carbon ratio | 2.1 | 1.6 | 14.5 | 11.6 | 7.3 |
| Run time, minutes | 105 | 90 | 120 | 120 | 105 |
| Rate of reactor pressure drop (ΔP) increase, inches H₂O/hr | 0 | 0 | 9 | 0 | 5.6 |
| Product gas, mol percent: | | | | | |
| H₂ | 73.0 | 71.9 | 76.2 | 76.6 | 75.9 |
| CO | 20.5 | 24.2 | 7.0 | 5.1 | 8.3 |
| CO₂ | 6.2 | 3.2 | 16.8 | 18.3 | 15.8 |
| CH₄ | 0.3 | 0.7 | | | |
| C₂s | | | | | |
| Minimum steam/carbon ratio | | ¹<1.6 | 15 | | 7.0 |
| Feed conversion, volume percent | 100.0 | 100.0 | 100.0 | 100.0 | 100.7 |

¹ Since no rise in the reactor pressure drop was observed at the indicated H₂O/C₁ ratio, the minimum ratio is below the actual operating H₂O/C₁ ratio employed in the run.

Inspection of the data of Table I shows that when using Catalyst A composed of 0.1 weight percent nickel supported on zirconia, steam reforming of the highly olefinic feed occurred at the low steam/carbon ratio of 1.6 without carbon plugging of the catalyst bed. On the other hand, at the higher nickel contents of 1.3 and 3.6 weight percent as in Catalysts B and C, the catalyst bed plugged severely at the substantially higher steam/carbon ratios of 15 and 7.7, respectively.

A reduction in steam requirements as the content of nickel is lowered, was also observed when the nickel was supported on alumina as demonstrated by the following Catalysts D through H. These latter catalysts were prepared by impregnating a carrier (12/20 mesh) composed of about 99 percent by weight of the high temperature form of alumina (alpha alumina) and about 1 percent iron oxide, with an aqueous solution of nickel nitrate hexahydrate in an amount sufficient to yield varying amounts of nickel in the catalyst. In each case the impregnated support was mixed thoroughly with the solution, dried at 240° F., and then calcined at 1000° F. for 2 hours. The following Table II is a tabulation of the weight of the support so treated, the volume of the nickel salt treating solution and its content or dissolved nickel nitrate hexahydrate, and the weight percent nickel equivalent to the amount of nickel salt deposited in the catalyst, based on the total weight of the composite.

TABLE II

| | Weight of Support | Nickel Nitrate Hexahydrate Solution | | Weight Percent Nickel |
|---|---|---|---|---|
| | | Volume (cc.) | Nickel Salt (grams) | |
| Catalyst Designation: | | | | |
| D | 200 | 57.6 | 0.99 | 0.1 |
| E | 200 | 56.2 | 4.95 | 0.5 |
| F | 200 | 54.3 | 9.9 | 1.0 |
| G | 200 | 46.6 | 30.72 | 3 |
| H | 120 | 8.5 | 67.5 | 10 |

With the above described equipment and procedure, a series of runs was made at atmospheric pressure with each of catalysts D through H as freshly prepared using a hydrocarbon feed containing 70 mol percent ethylene and 30 mol percent ethane. In each series the initial run was at a high steam-to-carbon ratio which was gradually reduced in successive runs until carbon formation resulted as indicated by a rise in the pressure drop across the catalyst bed. The particular operating conditions employed and results obtained in the testing of Catalysts D through H are tabulated in the following Table III.

TABLE III

| | Run Number | | | | | | | | | |
|---|---|---|---|---|---|---|---|---|---|---|
| | 6 | 7 | 8 | 9 | 10 | 11 | 12 | 13 | 14 | 15 |
| | Catalyst Designation | | | | | | | | | |
| | D | | E | | F | | G | | H | |
| Support | Alumina | | Alumina | | Alumina | | Alumina | | Alumina | |
| Nickel, weight percent | 0.1 | | 0.5 | | 1.0 | | 3 | | 10 | |
| Volume, cc | 100 | | 100 | | 110 | | 100 | | 100 | |
| Weight, grams | 117.1 | | 116.0 | | 124.1 | | 112.9 | | 127.0 | |
| Hydrocarbon feedstock | 30 mol percent ethane/70 mol percent ethylene | | | | | | | | | |
| Operating Conditions: | | | | | | | | | | |
| Reactor temperature, °F., top | 1,125 | 1,132 | 1,118 | 1,118 | 1,069 | 1,055 | 1,145 | 1,150 | 1,081 | 1,076 |
| Reactor temperature, °F., middle | 1,338 | 1,332 | 1,298 | 1,300 | 1,338 | 1,320 | 1,320 | 1,328 | 1,316 | 1,296 |
| Reactor temperature, °F., bottom | 1,418 | 1,425 | 1,412 | 1,420 | 1,417 | 1,417 | 1,407 | 1,415 | 1,424 | 1,422 |
| Flow Rate: | | | | | | | | | | |
| Hydrocarbon, cc./minute | 101 | 98 | 109 | 92 | 31 | 58 | 97 | 103 | 81 | 111 |
| Steam, cc./minute | 0.46 | 0.24 | 0.68 | 0.56 | 0.80 | 0.80 | 0.74 | 0.53 | 0.70 | 0.83 |
| Space velocity, cc. C₁/hr./cc. catalyst | 121 | 118 | 131 | 111 | 34 | 63 | 116 | 123 | 97 | 133 |
| Steam/Carbon ratio | 3.1 | 1.6 | 4.1 | 3.4 | 17.3 | 9.3 | 5.1 | 3.4 | 5.8 | 4.4 |
| Run time, minutes | 120 | 165 | 60 | 120 | 120 | 120 | 120 | 195 | 120 | 105 |
| Rate of reactor pressure drop (ΔP) increase, inches H₂O/hr | 0 | 0.9 | 0 | 1.4 | 0 | 0.4 | 0 | 0.6 | 0 | 0.4 |
| Product gas, mol percent: | | | | | | | | | | |
| H₂ | 73.8 | 72.4 | 75.0 | 74.5 | 76.8 | 76.4 | 75.5 | 73.2 | 75.6 | 71.2 |
| CO | 14.5 | 22.8 | 12.0 | 14.5 | 4.4 | 6.0 | 10.4 | 14.7 | 9.8 | 13.2 |
| CO₂ | 10.7 | 4.4 | 13.0 | 11.0 | 18.8 | 17.6 | 14.1 | 12.1 | 14.6 | 15.6 |
| CH₄ | | 0.3 | | | | | | | | |
| C₂s | 1.0 | 0.1 | | | | | | | | |
| Minimum steam/carbon ratio | | 1.7 | | 3.5 | | 9.3 | | 3.4 | | 4.4 |
| Feed conversion, volume percent | 92.6 | 99.3 | 100.0 | 100.0 | 100.0 | 100.0 | 100.0 | 100.0 | 100.0 | 100.0 |

Inspection of the data of Table III shows that reduction in the nickel content of the alumina supported catalysts from 10 weight percent to 0.1 weight percent resulted in a lowering of the minimum steam-to-carbon ratio from 4.4 to 1.7, or a 61 percent reduction in the steam required to obtain carbon-free steam reforming.

In addition to the ability of a catalyst to convert feeds at reduced steam levels and with high conversion of feedstock, it is highly desirable that the catalyst retain these properties during continuous and prolonged use. In order to determine the effect of prolonged reforming conditions and exposure to steam upon their activity and ability to convert the hydrocarbon feed at a low steam-carbon ratio, Catalysts A, D and G above were subjected to an accelerated aging test. The steaming was performed by exposing each of Catalysts A, D and G after use in the indicated runs of Tables I and III to steam at 1600° F. for a period of 6 days or 144 hours. Thereafter, each of the aged catalysts, now designated as Catalysts A', D' and G' respectively, were used for the steam reforming of a hydrocarbon feed containing 70 mol percent ethylene and 30 mol percent ethane at atmospheric pressure using the above-described equipment and steam reforming procedure. The particular operating conditions and results obtained in these tests are tabulated in the following Table IV.

to form an inactive form of nickel. Although the activity of Catalyst G, now designated G', containing 3 percent nickel on alumina was still high as shown by the high conversion of feed obtained in run 20, there was heavy deposition of carbon on the catalyst as demonstrated by the increase in the pressure drop across the catalyst bed, the minimum steam-to-carbon ratio having increased from 3.4 to 9.9. On the other hand, after the accelerated aging test of runs 16 and 17, zirconia-supported Catalyst A containing 0.1 percent by weight nickel, and now designated as A', maintained both its activity as shown by the high conversion of feed, and its ability to reform at a low steam-to-carbon ratio. Thus from the standpoint of maintenance of activity during use as a steam reforming catalyst, the zirconia supported low nickel catalysts of this invention are far superior to the alumina supported contact materials.

That the catalysts of this invention are also superior to a steam reforming catalyst of high nickel content supported on an alumina-type cement is demonstrated by the results obtained using a commercially available steam reforming catalyst containing 32.0 weight percent of nickel oxide supported on a cement type support composed of 13.9 percent alumina and iron oxide (on a combined basis), 25.5 percent silica, 9.9 percent magnesia

TABLE IV

| | Run Number | | | | |
|---|---|---|---|---|---|
| | 16 | 17 | 18 | 19 | 20 |
| | Catalyst Designation | | | | |
| | A' | | D' | | G' |
| Support | Zirconia | | Alumina | | |
| Nickel, weight percent | 0.1 | | 0.1 | | 3 |
| Volume, cc | 105.0 | | 77.5 | | 84.0 |
| Weight, grams | 189.3 | | 82.4 | | 94.6 |
| Hydrocarbon feedstock | 70 mol percent ethylene/30 mol percent ethane | | | | |
| Operating Conditions: | | | | | |
| Reactor temperature, ° F., top | 1,203 | 1,219 | 1,168 | 1,177 | 7,055 |
| Reactor temperature, ° F., middle | 1,280 | 1,294 | 1,338 | 1,354 | 1,343 |
| Reactor temperature, ° F., bottom | 1,432 | 1,430 | 1,420 | 1,427 | 1,428 |
| Flow Rate: | | | | | |
| Hydrocarbon, cc./min | 94 | 109 | 134 | 143 | 38 |
| Steam, cc./min | 0.25 | 0.21 | 0.62 | 0.43 | 0.56 |
| Space velocity, cc. $C_1$/hr./cc. catalyst | 107 | 125 | 208 | 221 | 55 |
| Steam/Carbon ratio | 1.8 | 1.3 | 3.1 | 2.0 | 9.7 |
| Run time, minutes | 120 | 120 | 60 | 105 | 105 |
| Rate of reactor pressure drop ($\Delta P$) increase, inches $H_2O$/hr | 0 | 0 | 0 | 0 | 4.3 |
| Product gas, mol percent: | | | | | |
| $H_2$ | 72.3 | 70.8 | 59.4 | 57.0 | 76.6 |
| CO | 22.3 | 25.4 | 18.6 | 17.4 | 5.3 |
| $CO_2$ | 4.7 | 2.1 | 3.7 | 3.9 | 18.1 |
| $CH_4$ | 0.7 | 1.7 | | 0.5 | |
| $C_2s$ | | | 18.3 | 21.2 | |
| Minimum steam/Carbon ratio | <1.3 | | <2.0 | | 9.9 |
| Feed conversion, volume percent | 100.0 | 100.0 | 35.4 | 34.0 | 100.0 |

The data of runs 18 and 19 of Table IV show that after the aging test, the activity of alumina supported Catalyst D, now designated Catalyst D', declined rapidly as evidenced by a drop in the conversion of feed from a value above 90 percent to only 34 percent. This marked decline in steam reforming activity may be attributable to the reaction of the nickel component with the alumina support and 18.7 percent calcium oxide. This catalyst, designated Catalyst I was also tested using a feed containing 70 mol percent ethylene and 30 mol percent ethane at atmospheric pressure using substantially the same procedure employed in the performance of the above runs. The specific operating conditions and results are tabulated in the following Table V.

TABLE V

| | Run Number | |
|---|---|---|
| | 21 | 22 |
| | Catalyst Number | |
| | I | |
| Operating Conditions: | | |
| Catalyst weight, grams | 102.1 | 102.1 |
| Reactor temperature, °F., top | | 1,191 |
| Reactor temperature, °F., middle | | |
| Reactor temperature, °F., bottom | 1,430 | 1,431 |
| Flow Rate: | | |
| cc. hydrocarbon/minute | 44 | 69 |
| cc. $H_2O$/minute | 0.72 | 0.59 |
| Space velocity of feed cc. $C_1$/hr./cc. catalyst | 53 | 83 |
| Space velocity of ethylene in feed | 37 | 60 |
| $H_2O/C_1$ ratio | 11.0 | 5.7 |
| Run time, minutes | 135 | 47 |
| Rate of reactor pressure drop ($\Delta P$) increase, inches $H_2O$/hr. | 0 | 40.2 |
| Product gas analysis, mol percent: | | |
| $H_2$ | 74.7 | 74.7 |
| CO | 5.0 | 7.4 |
| $CO_2$ | 20.3 | 17.9 |
| Estimated minimum $H_2O/C_1$ ratio based on the rate of reactor pressure drop increase. | | 7.0 |

Comparison of the high steam-to-carbon ratio required by Catalyst I to obtain carbon-free steam reforming, with the low ratio at which steam reforming proceeds in the presence of the low nickel on zirconia catalysts of this invention further demonstrates their superior catalytic properties.

Thus by the present invention, a novel and improved contact material is provided which allows for the steam reforming of feeds which are otherwise at best only difficulty reformed, such as normally liquid feeds and feeds of high olefinic content, and thus improvement in steam reforming is also realized. Various modifications of the contact materials and the process of this invention may become apparent to those skilled in the art without departing from the scope of this invention.

Having described our invention we claim:

1. A process for the production of gaseous product comprising hydrogen which comprises contacting a hydrocarbon with steam at an elevated temperature in the presence of a catalyst composed of a nickel component and zirconia in which the nickel component is present in an amount between about 0.01 and about 0.7 weight percent expressed as elemental nickel and based on the total weight of the catalyst, under conditions such that gaseous product comprising hydrogen is produced.

2. A process for the production of hydrogen which comprises contacting steam and a feed containing between about 5 and about 90 mol percent olefin at a temperature between about 600° F. and about 1800° F. in the presence of a catalyst composed of a nickel component and zirconia in which said nickel component is present in an amount between about 0.01 and about 0.7 weight percent expressed as elemental nickel and based on the total weight of the catalyst, to produce gaseous product comprising hydrogen.

3. The process of claim 2 in which said feed comprises ethylene.

4. The process of claim 2 in which said feed comprises propylene.

5. A process for the production of hydrogen which comprises contacting a normally liquid hydrocarbon feed with steam at a temperature between about 600° F. and about 1800° F. in the presence of a catalyst composed of a nickel component and zirconia in which the nickel component is present in an amount between about 0.01 and about 0.7 expressed as elemental nickel and based on the total weight of the catalyst, to produce gaseous product comprising hydrogen.

6. The process of claim 5 in which said normally liquid hydrocarbon feed is naphtha.

7. A process for the conversion of hydrocarbons with steam to produce hydrogen which comprises contacting steam and a hydrocarbon feed in which the predominant components have a molecular weight above that of methane at a temperature between about 1000° F. and about 1800° F. and a pressure between about 0 and about 1000 pounds per square inch gage in the presence of a catalyst consisting of a nickel component selected from the group consisting of elemental nickel, nickel oxide and mixtures thereof distributed on zirconia, said nickel component being present in an amount between about 0.05 and about 0.5 expressed as elemental nickel and based on the total weight of the catalyst, to produce gaseous product comprising hydrogen.

8. A process for the steam reforming of hydrocarbons which comprises passing steam and hydrocarbon feed containing up to about 80 mol percent olefin to a steam reforming zone maintained at a temperature between about 1000° and about 1800° F. and a pressure up to about 800 pounds per square inch gage, in said reforming zone contacting said feed with a catalyst consisting of a nickel component distributed on zirconia and in which the nickel component is present in an amount between about 0.05 and about 0.5 weight percent expressed as elemental nickel and based on the total weight of the catalyst, and withdrawing effluent from said zone comprising hydrogen and carbon oxides.

9. A process for the production of hydrogen rich gas which comprises contacting a normally gaseous feed containing a major proportion of olefins with steam in the presence of a catalyst consisting of a member of the group consisting of elemental nickel, nickel oxide and mixtures thereof supported on zirconia, the nickel component being present in an amount of about 0.1 weight percent expressed as elemental nickel and based on the total weight of the catalyst and said support consisting of at least 90 weight percent of an oxidic compound of zirconium, expressed as zirconium dioxide, and based on the weight of the support, to produce gaseous product comprising hydrogen.

10. A composition of matter consisting of a nickel component on a zirconia support in which said nickel component is present in an amount between about 0.01 and about 0.7 weight percent expressed as elemental nickel and based on the total weight of the composition.

11. A composition of matter consisting of a nickel component distributed on a support composed of at least 90 weight percent of an oxidic compound of zirconium, expressed as zirconium dioxide, and in which said nickel component is present in an amount between about 0.01 and about 0.7 weight percent expressed as elemental nickel and based on the total weight of the composition.

12. A composition of matter consisting of a nickel component selected from the group consisting of elemental nickel, nickel oxide and mixtures thereof distributed on a zirconia support and in which said nickel component is present in an amount between about 0.05 and about 0.5 weight percent expressed as elemental nickel and based on the total weight of the support.

References Cited

UNITED STATES PATENTS 1,673,032   6/1928   Williams.
3,103,423   9/1963   Pearce _____ 48—214

FOREIGN PATENTS 772,787   4/1957   Great Britain.

MORRIS O. WOLK, Primary Examiner

R. E. SERWIN, Assistant Examiner

U.S. Cl. X.R.

252—461

PO-1050
(5/69)

UNITED STATES PATENT OFFICE
CERTIFICATE OF CORRECTION

Patent No. 3,476,536  Dated November 4, 1969

Inventor(s) Joseph F. McMahon and Thomas H. Milliken

It is certified that error appears in the above-identified patent and that said Letters Patent are hereby corrected as shown below:

Columns 7 and 8, TABLE I, last column, second line from the bottom thereof, "7.0" should read --7.7--; same table, same column, last line thereof, "100.7" should read --100.0--; same table, first line of the footnote thereto, "$C_1 1$" should read --$C_1$--. Column 7, line 51, "or" should read --of--. Column 9, TABLE IV, last column, fifth line thereof, above "3" insert --Alumina--; same table, same column, tenth line thereof, "7,055" should read --1,055--.

SIGNED AND
SEALED
OCT 13 1970

(SEAL)
Attest:

Edward M. Fletcher, Jr.
Attesting Officer

WILLIAM E. SCHUYLER, JR.
Commissioner of Patents